C. Rogers,
Hay Shreader.

No. 69487.    Patented Oct. 1. 1867.

Witnesses:    Chas Rogers,
              per Brown, Coombs & Co.
              Atty

United States Patent Office.

CHARLES ROGERS, OF BARKER, NEW YORK.

Letters Patent No. 69,487, dated October 1, 1867

IMPROVEMENT IN COMBINED HORSE-RAKE AND HAY-SPREADER.

The Schedule referred to in these Letters Patent and making part of the same.

TO ALL WHOM IT MAY CONCERN:

Be it known that I, CHARLES ROGERS, of Barker, in the county of Broome, and State of New York, have invented certain new and useful improvements in Combined Hay-Rakes and Tedders; and I do hereby declare that the following is a full, clear, and exact description of the same, reference being had to the accompanying drawings, making a portion of this specification, in which—

Similar letters of reference indicate corresponding parts in all the figures.

This invention consists in a frame arranged in rear of a suitable axle, and supported by a caster-wheel, in combination with bearings provided at the rearmost end of the aforesaid frame, for the reception of the head of the rake, or of the rotating tedder, as may be desired, whereby the said rake or tedder is enabled to conform to inequalities in the surface of the ground, thus securing a very efficient operation of the same, either in raking or tedding, as the case may be.

To enable others to understand the construction and operation of my invention, I will proceed to describe it with reference to the drawings.

Figure 1:
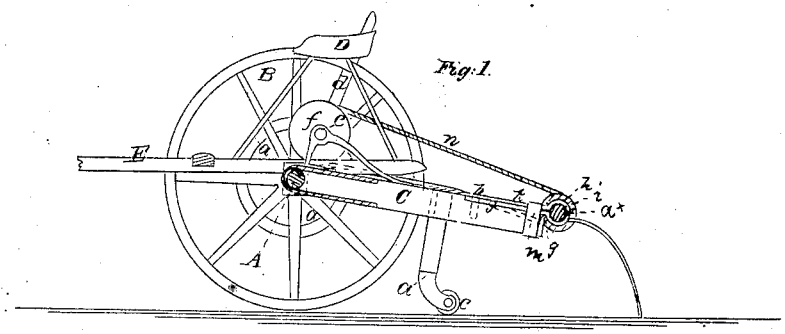
Figure 1 is a longitudinal vertical section of a combined rake and tedder, constructed according to my invention, showing the machine as adapted for use as a horse-rake.
Figure 2:
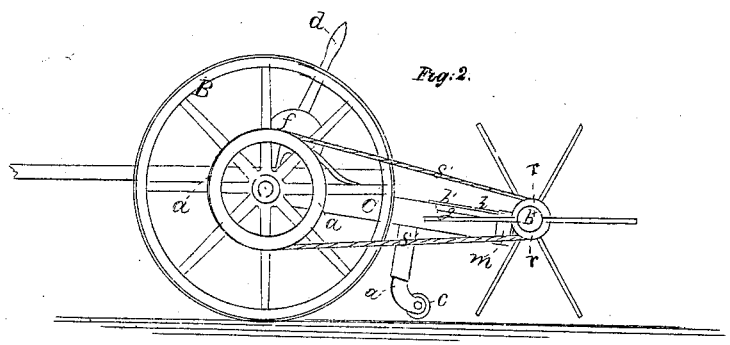
Figure 2 is a side view of the same as used for a tedder.
Figure 3:
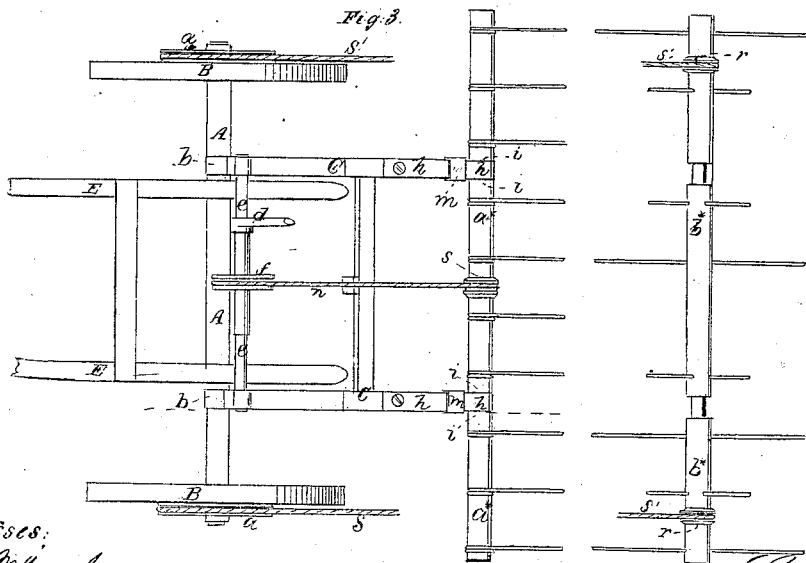
Figure 3 is a plan view of the same, showing the position of the several parts when used either as a rake or tedder.

The axle A is supported by two wheels B, upon the outer side of each of which is formed or secured a band-pulley, $a$. The horizontal frame C is situated behind the axle, and attached or hinged thereto by straps $b$. This frame is provided at its central part, or, if desired, toward its rear end, with a supporting caster-wheel, $c$, which turns freely upon a vertical arbor, $a'$. The driver's seat is shown at D, behind the thills E, and in convenient proximity to this seat is an upright lever, $d$, the lower end of which is attached to a transverse rock-shaft, $e$, which is furnished near the centre thereof with a band-wheel or disk, $f$. The bearings which receive the head of the rake or tedder, as hereinafter fully set forth, are situated at the rear end of the frame C, one at each side thereof, and are each formed of two straps or plates, $g\ h$, the outermost or rear ends of which are made of semicircular form, so as to constitute together a circular "box" or bearing for the cylindrical portion $i$ of the rake or tedder-head, as presently herein set forth. The lowermost plate or strap, $g$, of each bearing, is rigidly fixed to the frame C, but the uppermost one is attached thereto only at its forward extremity, as shown at $b'$, and is made elastic in such manner that, when desired, it may be forced or sprung upward, to permit the removal or insertion, as the case may be, of the rake or tedder-head, and is held down upon the lower strap $g$ by a sliding band or collar, $m$, which is forced back against the curved or semicircular portions of the straps, as shown in the several figures. When the rake, the head of which is marked $a^*$ in the drawings, is pivoted in the bearings $g\ h$, as shown in fig. 1, and hereinbefore explained, an endless band, $n$, is passed from the band-wheel $f$ over a smaller pulley or wheel, $s$, formed upon the rake-head, so that by simply pushing forward the lever $d$, the rake will be raised or tilted upward, to deposit the grass or hay at intervals during the raking operation. When it is desired to use the machine for tedding, the rake is removed by first slipping the bands or collars $m$ forward, clear of the straps $g$, and springing the said straps upward, as hereinbefore set forth, and is replaced by the tedder, the head of which is marked $b^*$ in the drawings, and has fitted upon each end thereof a band-pulley, $r$. These band-pulleys $r$ are connected by belts $s'$ with the band-pulley $a$ of the driving or supporting-wheels, so that the forward movement of the machine communicates to the tedder the rotary motion required in tedding or spreading the hay or grass. Inasmuch as the frame C is hinged or pivoted to the axle, and is supported by the caster-wheel $c$, it follows that the said frame is allowed to rise and fall with the inequalities of the ground, and thus retain the rake or tedder, according as one or the other is employed, in proper position with reference to the aforesaid surface of the ground, thus insuring the most efficient operation of the machine.

What I claim as my invention, and desire to secure by Letters Patent, is—

The frame C, arranged in rear of the axle A, and supported by the caster-wheel $c$, in combination with the bearings $g\ h$ and the head of a rake or tedder, substantially as and for the purpose specified.

CHARLES ROGERS.

Witnesses:
J. W. COOMBS,
G. W. REED.